UNITED STATES PATENT OFFICE.

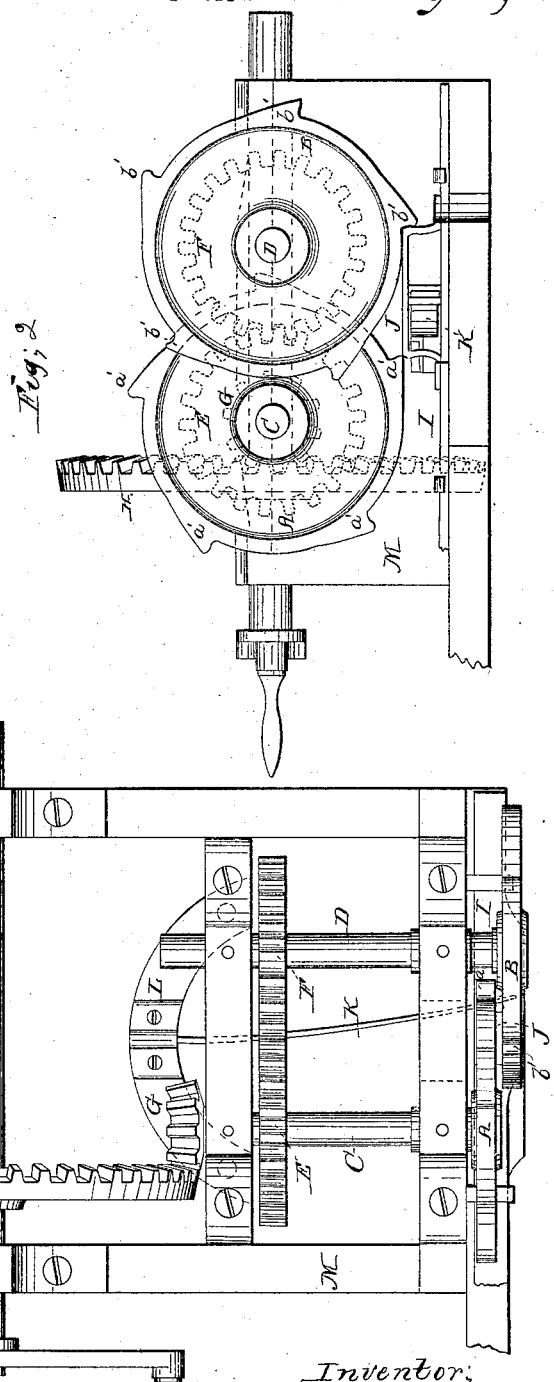

PHILIP C. VAN BROCKLIN, OF BUFFALO, NEW YORK.

IMPROVEMENT IN CONVERTING ROTARY INTO RECIPROCATING MOTION.

Specification forming part of Letters Patent No. 35,903, dated July 15, 1862.

*To all whom it may concern:*

Be it known that I, PHILIP C. VAN BROCKLIN, of the city of Buffalo, and State of New York, have invented a new and Improved Mode of Converting Rotary into Reciprocating Motion; and I do hereby declare that the following is a full, clear, and exact description of the construction and operation of the same, reference being had to the accompanying drawings, in which—

Figure I is an elevation showing two toothed wheels as arranged to act directly upon the body to be reciprocated. Fig. II is a plan.

Letters of like name and kind refer to like parts in each of the figures.

The nature of my invention relates, first, to a new mode of converting rotary into reciprocating motion by the use of two toothed wheels revolving in opposite directions and acting directly upon the body to be moved without the intermediate use of connecting-rod or levers; second, in the combination of a spring with said toothed wheels in order to react upon the projectile force of the reciprocating body at each extremity of its movement.

A and B represent two wheels having cog projections or spur-teeth on the periphery at remote distances from each other, as shown at $a'$ and $b'$. These teeth are made in the form of spur-teeth upon their driving side, and, for the purpose of strength, are left full on the other side, they being intended to drive only in one direction. These toothed wheels are each hung upon the end of an appropriate shaft, C and D, so that they will overlap each other and revolve in parallel planes in such a manner that the teeth of each will act directly upon the body to be vibrated.

Upon each shaft C and D is a full spur-wheel, as shown at E and F, which are of equal size and mesh together and cause the toothed wheels to revolve with equal velocity in opposite directions.

G is a pinion on the end of shaft C, which gears with the driving-wheel H, and through these wheels, as described, a rotary motion is communicated to the toothed wheels A and B.

As a modification in the arrangement of the gear, I also contemplate dispensing with the spur-wheels E and F, and in lieu thereof place a bevel-pinion on the end of shaft D to correspond with the bevel-pinion G, and then place a driving-wheel with a double face to mesh with said pinions. Other arrangements of gear may be adopted to give the requisite motion to the toothed wheels A and B.

At I is shown a bar, which is caused to reciprocate by the direct action of the toothed wheels thereon. Upon this bar, and as a part thereof, is a ledge, J, which has the form of a rack-tooth upon its bearing sides, against which the teeth of the wheels A and B act to drive the bar back and forth. The surface width of this ledge is equal to (or may exceed a little) the thickness of both toothed wheels, so that the toothed wheels may overlap each other and at the same time act upon the ledge. This ledge need not be raised more than the depth of the teeth on the wheels A and B above the reciprocating bar; or it may be raised more than that, as may be required, for adapting the same to different uses. The length of this ledge will be varied to correspond with different sizes of toothed wheels acting thereon, and also to correspond to the distance between the teeth on the periphery of the wheels and the required throw of the reciprocating bar. The "throw" of the reciprocating bar, or, in other words, the length of its horizontal or vertical movement, may be determined, first, by the size of the toothed wheels; second, by the length of the teeth; third, by the distance between the teeth on the periphery of the wheels, all of these being relatively combined. The form of this ledge upon the bearing sides thereof is that of a rack-tooth, and two rack-teeth placed in the same bearing position would have the same effect, and in some cases could be used to advantage.

At K is represented a straight spring, placed at right angles to the reciprocating bar, one end of which is made fast to the segment L, and the other end is left free to vibrate with the bar, the free end bearing against either side of a vertical slot, or between two projecting pins connected with the reciprocating bar, so that the spring will react upon the projectile force of the bar at each extremity of its movement, and thereby relieve the blows of the toothed wheels upon the ledge.

It is evident that this spring can be made sufficiently strong and properly bent so as to move the vibrating bar its whole distance in one direction, in which case one of the toothed wheels could be dispensed with; but by preference I use two wheels, as already described, as being more positive and reliable in action.

My improvement herein described is particularly adapted to vibrating the cutters of reaping and mowing machines, and as thus applied the reciprocating bar I may represent the cutter-bar of such machines. It is also applicable to most kinds of machinery where a rapid reciprocating motion is required. It may also, in like manner, be arranged to work the reciprocating bar vertically as well as horizontally.

M represents a frame-work for supporting my improvement.

What I claim as my invention, and desire to secure by Letters Patent, is—

1. The toothed wheels A and B, so arranged as to revolve in opposite directions and act directly upon the part to be reciprocated without the intermediate use of connecting-rod or levers, substantially as herein set forth.

2. The combination of the spring K with said toothed wheels and reciprocating bar, for the purposes and substantially as described.

P. C. VAN BROCKLIN.

Witnesses:
E. B. FORBUSH,
W. H. FORBUSH.